United States Patent
Beck et al.

(10) Patent No.: US 12,252,087 B1
(45) Date of Patent: Mar. 18, 2025

(54) METHOD AND SYSTEM TO CONTROL AIRBAG DEPLOYMENT FOR A PREGNANT OCCUPANT

(71) Applicant: FCA US LLC, Auburn Hills, MI (US)

(72) Inventors: Stephanie R Beck, Pinckney, MI (US); Anthony N Gorney, Oxford, MI (US); Omer Kiyani, Canton, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/499,427

(22) Filed: Nov. 1, 2023

(51) Int. Cl.
*B60R 21/01* (2006.01)
*B60R 21/00* (2006.01)
*B60R 21/203* (2006.01)

(52) U.S. Cl.
CPC ............ *B60R 21/01* (2013.01); *B60R 21/203* (2013.01); *B60R 2021/0062* (2013.01); *B60R 2021/01231* (2013.01)

(58) Field of Classification Search
CPC .. B60R 2021/0062; B60R 2021/01231; B60R 21/01; B60R 21/203; B60R 2021/01211; B60R 2021/01218; B60R 2021/01225; B60R 2021/01238
See application file for complete search history.

(56) References Cited

U.S. PATENT DOCUMENTS

| | | | |
|---|---|---|---|
| 5,893,580 A * | 4/1999 | Hoagland | B62D 1/197 280/731 |
| 5,924,726 A * | 7/1999 | Pan | B60R 21/18 280/733 |
| 7,226,076 B2 * | 6/2007 | Mattes | B60R 21/01526 280/735 |
| 7,653,467 B2 | 1/2010 | Bachmann et al. | |
| 7,796,021 B2 * | 9/2010 | Saban | B60N 2/002 701/29.1 |
| 9,509,775 B2 * | 11/2016 | Cuddihy | H04L 67/12 |
| 10,328,966 B2 * | 6/2019 | Riefe | B60R 21/01552 |
| 10,858,011 B1 * | 12/2020 | Christensen | B60R 21/20 |
| 10,967,824 B1 * | 4/2021 | Pertsel | B60R 21/01538 |
| 11,541,781 B2 * | 1/2023 | Unnervik | B60N 2/42736 |
| 2005/0016786 A1 * | 1/2005 | Mack | B60R 21/01532 180/271 |
| 2006/0173598 A1 * | 8/2006 | Moldenhauer | B60R 21/01558 701/45 |
| 2008/0306656 A1 * | 12/2008 | Baumann | B60N 2/0248 701/45 |
| 2009/0138159 A1 * | 5/2009 | Ewerhart | B60R 21/01512 701/45 |
| 2013/0226413 A1 * | 8/2013 | Cuddihy | B60N 2/002 701/45 |

FOREIGN PATENT DOCUMENTS

DE   19856129 A1 *   6/2000   ....... B60R 21/01538

* cited by examiner

*Primary Examiner* — Laura Freedman
(74) *Attorney, Agent, or Firm* — Jeremy J. Klobucar

(57) ABSTRACT

A method and system for controlling airbag deployment in a vehicle. The method may include the steps of receiving an input that a driver of the vehicle is pregnant, and changing an airbag deployment setting to account for a space reduction between the driver and an interior panel portion of the vehicle. In one implementation, the interior panel portion of the vehicle is a steering wheel.

19 Claims, 2 Drawing Sheets

METHOD AND SYSTEM TO CONTROL AIRBAG DEPLOYMENT FOR A PREGNANT OCCUPANT

FIELD

The present disclosure relates to control of airbag deployment in a vehicle.

BACKGROUND

Some pregnant drivers may be at an increased risk during airbag deployment. For example, fast deployment of the airbag could pose a risk to the mother and baby, since the abdomen is closer to where the airbag may be stored. Because of this, many pregnant women opt not to drive while pregnant, particularly in later stages of pregnancy. Accordingly, non-technical solutions include a pregnant woman not driving, riding as a passenger, or sitting at an undesirable distance from the steering wheel. More technical solutions, such as the use of occupant sensors to determine the weight, location, and/or angle of the person, do not provide a tailored approach to accommodating more fragile areas of a pregnant occupant, particularly when located in the more typically constrained driver's seat.

SUMMARY

In some implementations, there is a method and a system for controlling airbag deployment in a vehicle. An infotainment cluster can be configured to receive an input that a driver of the vehicle is pregnant, and an airbag deployment setting can be changed to account for a space reduction between the driver and an interior panel portion of the vehicle.

In the systems and methods set forth herein, the airbag deployment setting can be a deployment delay factor, which may be about 20-100 msec, inclusive, from a crash signal. The airbag deployment setting can be an inflation adjustment parameter to adjust an inflator of the airbag, and in one implementation, the inflation adjustment parameter is a gas flow rate, and the gas flow rate can be reduced after receiving the input that the driver of the vehicle is pregnant. In some implementations, the inflation adjustment parameter is a deployment volume reduction. In some implementations, the inflation adjustment parameter is an airbag intensity factor, with the intensity factor being a deployment time difference between the inflator and a second inflator.

In some implementations, the airbag deployment setting is a tilt angle of deployment. In embodiments in which the interior panel portion is a steering wheel and the tilt angle of deployment is a steering wheel angle, the steering wheel angle can change a face of the steering wheel to an angle between 20-80°, inclusive. The steering wheel angle can serve to at least partially orient a face of the steering wheel away from a midsection of the driver. When the interior panel portion of the vehicle is a steering wheel, the airbag deployment setting can also include a linear position adjustment to the steering wheel. The linear position adjustment may be a change in a vertical height of a front surface of the airbag that is configured to contact a midsection of the driver.

In some implementations, the input that the occupant is a pregnant driver is received via an infotainment cluster. A signal can then be sent from an infotainment module to an airbag control module. The signal may be transmitted between the infotainment module and the airbag control module via a body control module.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
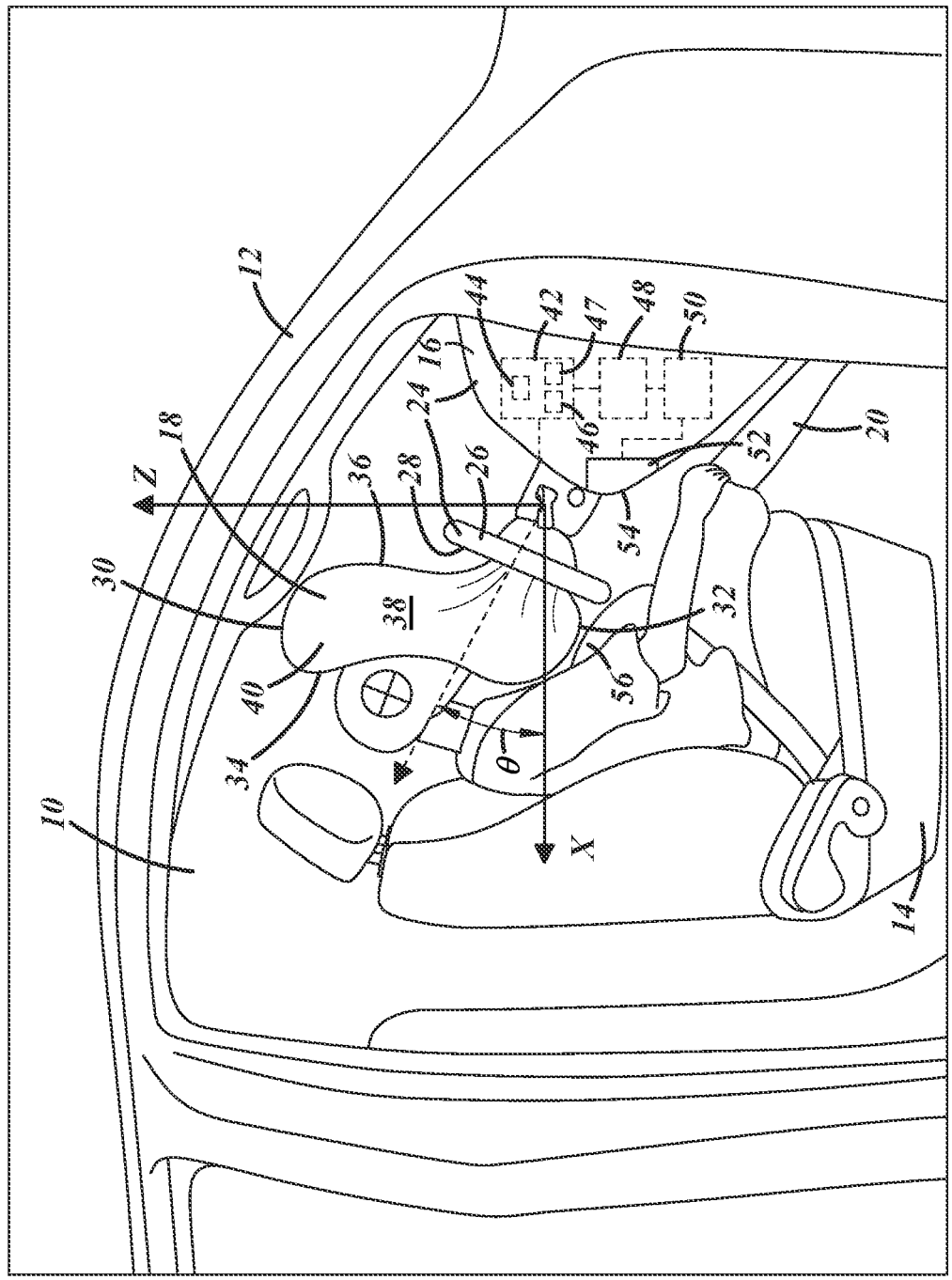
FIG. 1 is a side view of a portion of a vehicle showing a portion of a passenger compartment, a modeled pregnant passenger, and an airbag in an inflated state.

Referring in more detail to the drawings, FIG. 1 illustrates part of a passenger compartment 10 for a vehicle 12 including a seat 14 (shown here a driver's seat as opposed to a passenger seat), dashboard 16, and an inflatable cushion (commonly called an airbag 18) which is configured to contact occupant 20 during particular instances, such as during certain accident events. As detailed herein, the occupant 20 is a pregnant driver. In the illustrated example, the airbag 18 is contained behind a vehicle interior panel 24, which is a steering wheel 26 in this embodiment. More particularly, the airbag 18 is stored behind a face 28 of the steering wheel 26 and configured to inflate outwardly into the passenger compartment 10. It should be understood, however, that the airbag 18 may be configured behind a different vehicle interior panel 24 than what is particularly illustrated, such as at another place in the dashboard 16, in a door panel, or in another operable location within the passenger compartment 10.

The airbag 18 is situated within or behind the interior panel 24 prior to inflation and extends outwardly into the passenger compartment 10 when inflated. For ease of description and reference in this patent application, the direction from the front to the rear of the vehicle, generally parallel to the straight ahead forward movement of the vehicle, will be called longitudinal (along the X-axis), and the direction perpendicular to longitudinal between the driver's side door and passenger side door will be called lateral or cross-car. With this in mind, upon inflation, the airbag 18 moves both longitudinally toward one or more vehicle occupant(s) 20 and laterally to provide a wider lateral dimension for engaging the occupant(s). As shown in FIG. 1, the airbag 18 also expands vertically as it inflates, which is generally the direction between a roof and floor of the passenger compartment 10 (along the Z-axis).

The airbag 18 may be formed from conventional materials and methods to provide the above noted 3-dimensional cushion when inflated, and to facilitate orderly receipt within a housing or chute or chamber prior to inflation. The airbag 18 may be considered to have an upper surface 30 generally facing the vehicle roof, lower surface 32 generally facing the vehicle floor, front surface 34 generally facing the occupant 20 of the vehicle 12, a rear surface 36 facing away from the occupant, and opposing side surfaces 38 (only one visible in the illustration) generally facing the opposed driver's and passenger's sides of the vehicle. The airbag 18 may be comprised of one or more panels that may be formed from any suitable material and connected, if necessary, in any suitable manner, including stitches or a heat seam/weld, by way of two non-limiting examples. The various surfaces 32-38 or panels define a generally hollow interior or inner volume 40 of the airbag 18 which receives a gas to cause the airbag to expand and become inflated. The surfaces 32-38 of the airbag 18 need not be planar or generally flat and even a spherical airbag can be considered to have the noted upper, lower, front, rear and side surfaces. Suitable vents or other deployment control features be provided as is known in the art, to help manage the inflation and deflation speed and energy of the airbag 18.

The airbag 18 is configured to cooperate with an airbag module 42, having a controller 44 and one or more inflator(s) 46, 47. The airbag module 42 may also be known as an occupant restraint controller, and generally serves to control operation of the airbag 18. As detailed further herein, the airbag module 42 is configured to cooperate with a body control module 48 and/or an infotainment module 50. The airbag module 42 is schematically represented as being enclosed behind the dashboard 16, but it should be understood that one or more components of the airbag module 42 may be located within the steering wheel 26 itself (e.g., the inflator(s) 46, 47 are typically within close proximity to the airbag 18). Additionally, "module" as used herein is meant to denote a structural vehicle electronic component or specialized computer, which typically includes a controller or processor and memory. The modules 42, 48, 50 may be separate as shown, each having its own controller (as described with respect to the controller 44), which is more of a distributed arrangement. In other embodiments, a more centralized safety module or controller may be used to perform the various method steps described herein.

Each module 42, 48, 50 may include one or multiple controllers/processors 44, for receiving and/or transmitting various inputs and outputs. The modules 42, 48, 50 and/or one or more controllers 44 may include, but not be limited to, a processor(s), circuit(s), application specific integrated circuit(s) (ASIC), computer(s), DSP(s), memory, storage, register(s), timing, interrupt(s), communication interface(s), and input/output signal interfaces, and the like, as well as combinations comprising at least one of the foregoing. For example, the controller 44 can include or cooperate with memory that stores data/files and permits execution of the methods described herein, whether with one or more software or firmware programs or instructions, a combinational logic circuit, and/or other suitable components that provide the described functionality.

The body control module 48 can be used to control various functionalities within the vehicle 12, such as safety control features, interior/exterior lighting, motor control for components within the passenger compartment 10, to cite a few examples. Accordingly, in the illustrated implementation, the body control module 48 may act as an intermediary or hub between the airbag module 42 and the infotainment module 50, as well as other systems and modules, such as an active safety system or the like. The body control module 48, in addition to or instead of the airbag module 42, may also be used to accomplish one or more control outputs described herein. Each of the modules 42, 48, 50 may communicate via the bus system of the vehicle 10, or via any operable communication system.

The infotainment module 50 helps control an infotainment cluster 52 on the dashboard 16 of the vehicle 12. The infotainment cluster 52 can be used to control the primary audio and video systems of the vehicle 12. The infotainment cluster 52 includes a user interface 54, often a display and inputs, which may be provided via a touch screen display, provided with various menu options by which the occupant 20 can control certain vehicle systems like HVAC, music, information displays, and certain vehicle/preference settings like suspension stiffness, driving mode (e.g. normal, sport, and economy powertrain modes), safety feature accessibility, and the like.

Figure 2:
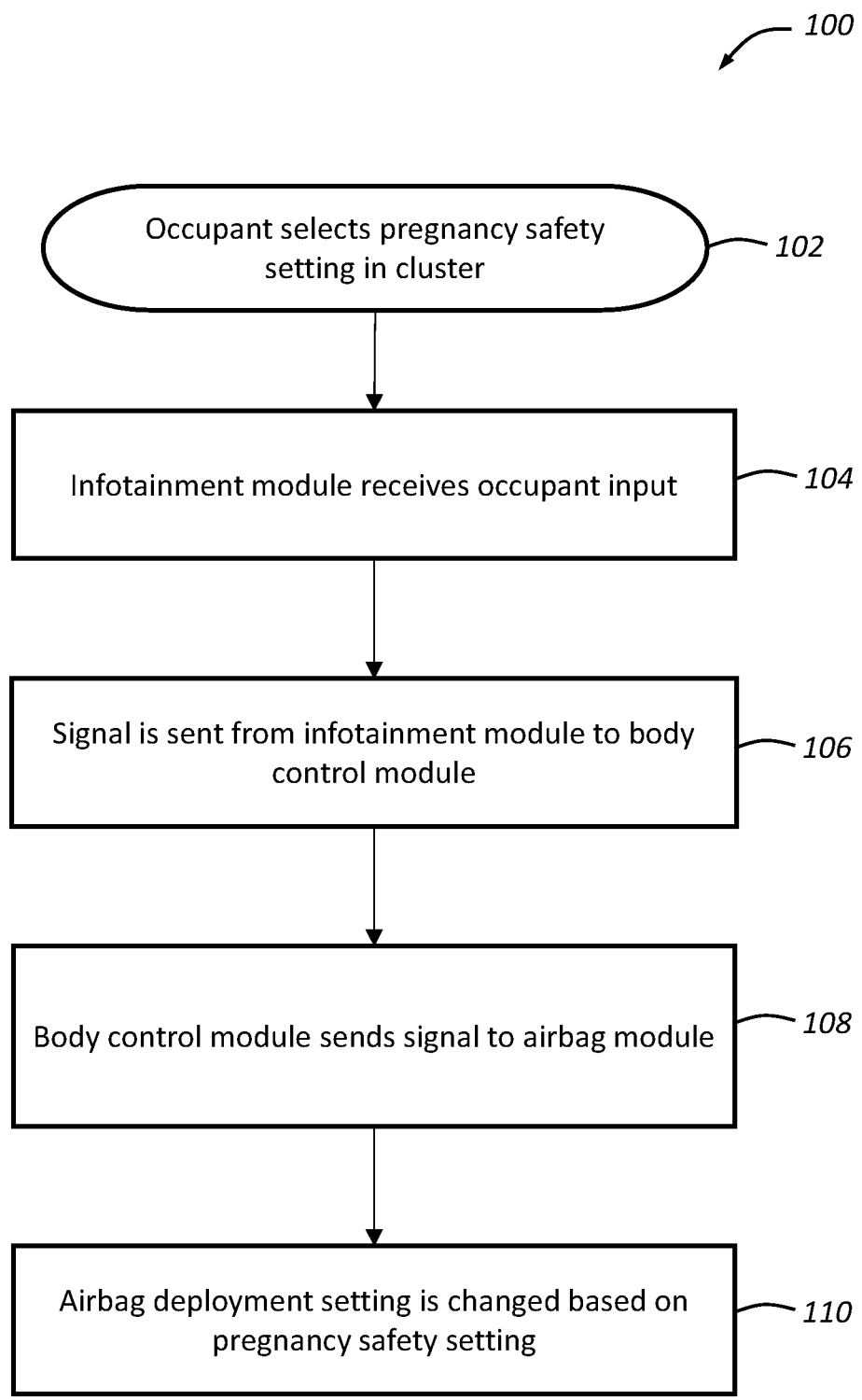
FIG. 2 is a flowchart of example method steps for controlling the airbag of FIG. 1.

FIG. 2 shows example steps of a method 100 that may be used to help strategically control airbag 18 deployment when the occupant 20 is a pregnant driver 20. It should be understood that the method 100 may be implemented with other safety systems, not just the system described in conjunction with the illustrated embodiment of FIG. 1. Additionally, the method 100 may be applicable to other airbag configurations and setups, beyond just the steering wheel 26 implementation. However, the method 100 and the various steps and sub-steps described herein may be advantageous in a situation in which the occupant 20 is a pregnant driver 20, as the space reduction between the seat 14 and the steering wheel 26 can be more pronounced in this area of the vehicle 12.

The method 100 includes a step 102 in which the occupant 20 selects a pregnancy safety setting in the infotainment cluster 52 or via a different interface (e.g. an application on a mobile device). This step provides input that there is a pregnant driver 20. It may be beneficial to notify the occupant 20 that the setting can change deployment of one or more airbags 18 in the passenger compartment 10, as a driver early in her pregnancy may wish to maintain a more standard deployment scheme. It may be possible for the vehicle to detect a pregnant driver automatically instead of having the occupant 20 change a setting via the infotainment cluster 52. However, inputs of weight, location, and/or angle from the occupant sensors alone are currently unable to facilitate an adjustment in airbag deployment to avoid a potentially forceful deployment into a midsection 56 of the pregnant driver 20 (the "midsection" as used herein is an area between the average pregnant person's sternum and hips). Accordingly, receiving an affirmative input from the occupant 20 can be beneficial to ensure the pregnant driver 20 wants to change the deployment strategy.

In step 104, the infotainment module 50 may initially receive the input that there is a pregnant driver 20. Given that input relating to the pregnancy status of the occupant 20 is advantageously received via the infotainment cluster 52, receiving the signal at the infotainment module 50 allows for the signal to then be sent to one or more other relevant electronic modules in the vehicle 12. The input may be in the form of a menu option, safety choice or profile, etc. In this particular embodiment, the signal is then sent in step 106 to the body control module 48, and the body control module then sends the signal to the airbag module 42. It should be understood that "signal" may include one signal, a plurality of linked or discrete signals that together convey the desired information, or another operable electronic communication mechanism.

In the method 100, using the body control module 48 as a hub in steps 106, 108 may provide the ability to coordinate signal processing within a single intermediary device. For example, the body control module 48 may also receive input, such as a crash signal, from impact sensors and/or an active safety system module. In other embodiments, the input regarding the pregnant driver 20 may be transmitted directly to the airbag module 42, or the body control module 48 may coordinate airbag deployment without a separate module just for the airbag 18, to cite a few potential examples.

Step 110 involves changing an airbag deployment setting to account for a space reduction between the pregnant driver 20 and the interior panel portion 24 of the vehicle 12. While more generic safety methods may be applicable to any pregnant occupant, step 110 helps address the space differential (or lack thereof) between the midsection 56 of the occupant 20 and an interior panel portion 24, such as the steering wheel 26. In some embodiments, multiple deployment settings are changed in step 110, and in other embodiments, only a single deployment setting is changed 110, and this variability in deployment settings will largely vary depending on the overall configuration of the airbag 18 and its position within the passenger compartment 10. There are various settings and parameters that can impact when contact is made between the airbag 18 and the pregnant driver 20, and in view of the more limited space at the midsection area 56, these settings and parameters can help account for the proximity between the midsection and the steering wheel 26.

In one embodiment, the airbag deployment setting is a deployment delay factor. This would serve to briefly delay deployment of the airbag 18, which may, for example, change the impact timing between the front surface 34 of the airbag and the pregnant driver 20. In one example, the deployment delay factor may be about 20-100 msec, inclusive, from a crash signal. In this embodiment, the crash signal may come from an active safety system, or the body control module 48, to cite a few operable examples.

In some embodiments, the airbag deployment setting is an inflation adjustment parameter. An inflation adjustment parameter works to change one or more settings relating to the inflator(s) 46, 47 for the airbag 18. In one implementation, the inflation adjustment parameter is a gas flow rate (e.g., liters per msec), which may be reduced in step 110 to help minimize the speed in which the airbag 18 travels the more limited distance between the midsection 56 and the steering wheel 26. In another implementation, the inflation adjustment parameter is a deployment volume reduction. Instead of, or in addition to, changing the deployment speed, the overall amount of gas from the inflator(s) 46, 47 may be reduced to decrease the size of the inner volume 40 of the airbag 18. This may be done in an absolute amount (e.g., with the pregnancy safety setting, the overall volume may be reduced by 25%), or may vary depending on a sensed spacing between the front face 28 of the steering wheel 26 and the midsection 56 (e.g., 25% reduction for a first distance, 30% reduction for a second distance that is smaller than the first distance, etc.).

In another implementation, the inflation adjustment parameter is an airbag intensity factor. The airbag intensity factor is a deployment time difference between the first inflator 46 and the second inflator 47. In some embodiments, there may also be more than two inflators, such that the deployment profile can be even further varied to provide different intensities. The shorter the time difference between initiation of the first inflator 46 and the second inflator 47, the higher the intensity. With higher intensity, the airbag 18 will typically stay inflated for a longer period to help protect the occupant 20. In one embodiment, the airbag intensity factor may increase the deployment time difference between the first inflator 46 and the second inflator 47.

In some embodiments, the airbag deployment setting is a tilt angle θ of deployment. The tilt angle θ of deployment may adjust the positioning of the stowed airbag 18 and chute within the interior panel 24 independently. This option, in some implementations, may require adjustments to the interior panel to ensure proper deployment within the range of accessible tilt angles. In one implementation, adjusting the tilt angle θ is accomplished by adjusting the steering wheel angle, as illustrated in FIG. 1. Advantageously, with a pregnant driver 20, the steering wheel angle θ at least partially orients the face 28 of the steering wheel 26 away from the midsection 56. If, for example, the steering wheel 26 is capable of moving between positions in which the face 28 is generally orthogonal with respect to the X-axis and Z-axis, respectively, a more advantageous tilt angle θ may be between about 20-80°, inclusive, or more preferably, 45-80°, inclusive.

In some embodiments, the airbag deployment setting is a linear position adjustment to the steering wheel 26. In this implementation, the steering wheel 26 may be moved longitudinally away from the pregnant driver 20 along the X-axis, or vertically away from the pregnant driver 20 along the Z-axis. Longitudinal adjustment may be used to decrease impact force, and vertical adjustment may be used to decrease the area of the front surface 34 that contacts the midsection 56 of the pregnant driver 20.

One or more of the airbag deployment settings may be used in combination, as desired. The airbag deployment systems and methods disclosed herein can improve the performance of an airbag with a pregnant driver and reduce injuries to the driver and fetus. The settings can be predetermined or they can be selected and implemented by a user, as desired. And the settings can be changed to accommodate physical changes of the driver during the course of a pregnancy.

What is claimed is:

1. A method of controlling airbag deployment in a vehicle, comprising:
  receiving an input that a driver of the vehicle is pregnant; and
  changing an airbag deployment setting to account for a space reduction between the driver and an interior panel portion of the vehicle, wherein the airbag deployment setting is a deployment delay factor.

2. The method of claim 1, wherein the deployment delay factor is about 20-100 msec, inclusive, from a crash signal.

3. The method of claim 1, wherein the airbag deployment setting is an inflation adjustment parameter to adjust an inflator of the airbag.

4. The method of claim 3, wherein the inflation adjustment parameter is a gas flow rate.

5. The method of claim 4, wherein the gas flow rate is reduced after receiving the input that the driver of the vehicle is pregnant.

6. The method of claim 3, wherein the inflation adjustment parameter is a deployment volume reduction.

7. The method of claim 3, wherein the inflation adjustment parameter is an airbag intensity factor.

8. The method of claim 1, wherein the airbag deployment setting is a tilt angle of deployment.

9. The method of claim 8, wherein the interior panel portion is a steering wheel and the tilt angle of deployment is a steering wheel angle.

10. The method of claim 9, wherein the steering wheel angle changes a face of the steering wheel to an angle between 20-80°, inclusive.

11. The method of claim 9, wherein the steering wheel angle at least partially orients a face of the steering wheel away from a midsection of the driver.

12. The method of claim 1, wherein the interior panel portion of the vehicle is a steering wheel and the airbag deployment setting is a linear position adjustment to the steering wheel.

13. The method of claim 1, wherein the airbag deployment setting is a change in a vertical height of a front surface of the airbag that is configured to contact a midsection of the driver.

14. The method of claim 1, wherein the input is received via an infotainment cluster.

15. The method of claim 14, further comprising the step of sending a signal from an infotainment module to an airbag control module.

16. The method of claim 15, wherein the signal is transmitted between the infotainment module and the airbag control module via a body control module.

17. A method of controlling airbag deployment in a vehicle, comprising:
receiving an input that a driver of the vehicle is pregnant; and
changing an airbag deployment setting to account for a space reduction between the driver and an interior panel portion of the vehicle, wherein the airbag deployment setting is an inflation adjustment parameter to adjust an inflator of the airbag, the inflation adjustment parameter is an airbag intensity factor, and wherein the airbag intensity factor is a deployment time difference between the inflator and a second inflator.

18. A system for controlling airbag deployment in a vehicle, comprising:
an infotainment cluster configured to receive an input that a driver of the vehicle is pregnant;
an airbag control module having a controller configured to receive the input that the driver of the vehicle is pregnant from the infotainment cluster and change an airbag deployment setting for an airbag to account for a space reduction between the driver and an interior panel portion of the vehicle wherein the airbag deployment setting is a deployment delay factor.

19. The system of claim 18, wherein the interior panel portion is a steering wheel and the airbag is a steering wheel airbag.

* * * * *